Figure 1:
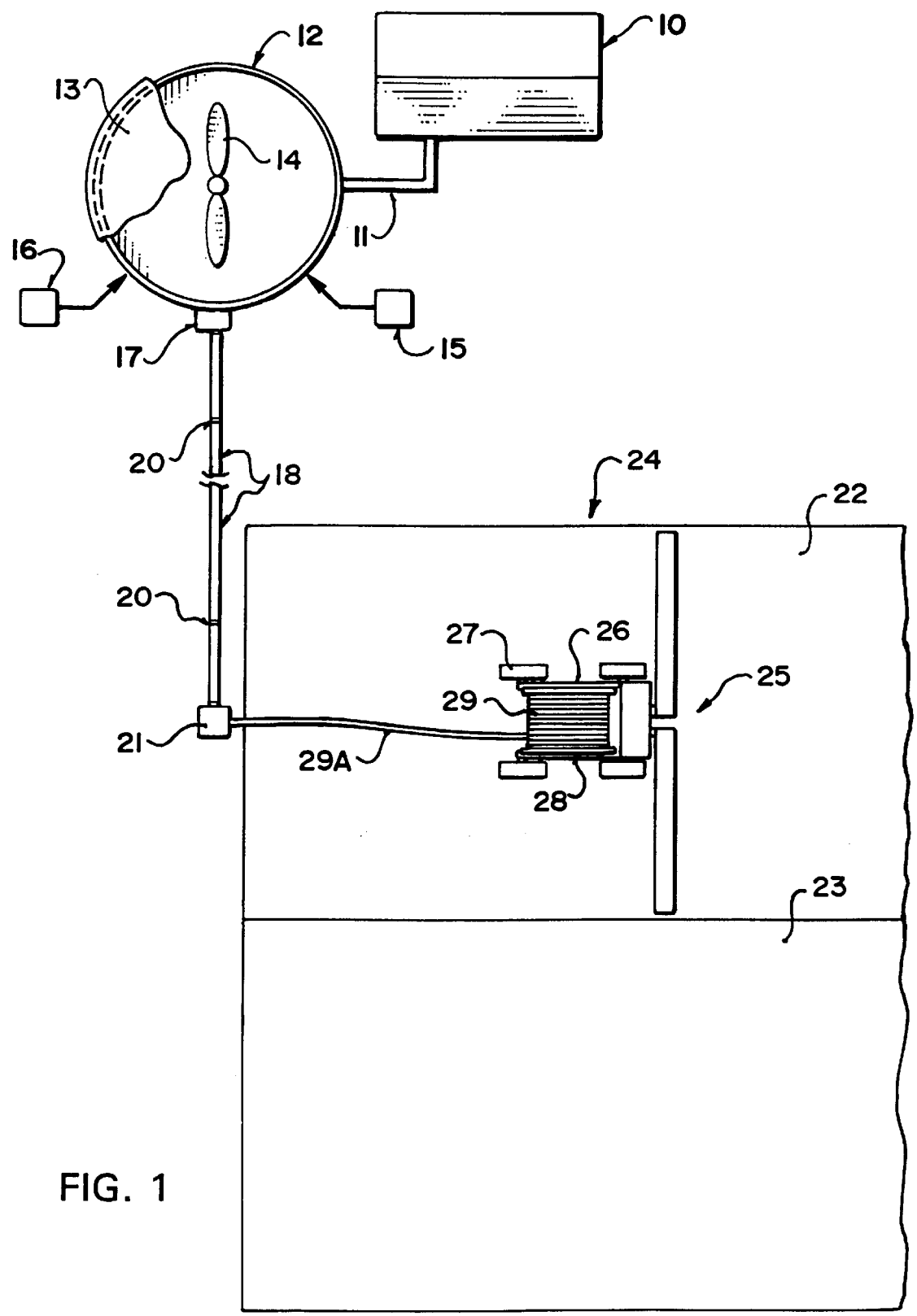

United States Patent [19]
Guyot

[11] Patent Number: 5,907,925
[45] Date of Patent: Jun. 1, 1999

[54] METHOD FOR TREATMENT OF WASTE MATERIAL

[76] Inventor: Jean Noel Guyot, Box 179, Oak Bluff, Manitoba, Canada, R0G 1N0

[21] Appl. No.: 08/762,659

[22] Filed: Dec. 9, 1996

[51] Int. Cl.⁶ .......................... A01B 79/00; A01G 29/00; B05B 1/20; B05B 1/16
[52] U.S. Cl. ................. 47/58.1; 47/48.5; 47/DIG. 10; 239/159; 239/170; 210/602; 210/688; 71/32; 71/54
[58] Field of Search ..................... 47/48.5, 58.1, 47/DIG. 10; 75/710; 71/32, 54; 239/159, 170

[56] References Cited

U.S. PATENT DOCUMENTS

| | | | |
|---|---|---|---|
| 3,844,481 | 10/1974 | Livingston | 239/177 |
| 4,649,113 | 3/1987 | Gould | 435/165 |
| 5,005,345 | 4/1991 | Pinckard et al. | 56/71 |
| 5,364,451 | 11/1994 | Raskin et al. | 75/710 |

FOREIGN PATENT DOCUMENTS

| | | |
|---|---|---|
| 2124047 | 11/1995 | Canada . |
| 87 13335 | 9/1987 | France . |
| 90 00194 | 1/1990 | France . |
| 7514909 | 12/1975 | Netherlands . |
| 1358-849 | 12/1987 | U.S.S.R. . |
| WO 92/10882 | 6/1992 | WIPO . |

OTHER PUBLICATIONS

Brochure—Bauer—Boom Cart AS 45.
Article—Fertilisation Du lisier sur blé.
Agi–Chem brochure (48 pages).
Calibron Systems, Inc., brochure (3 pages).

*Primary Examiner*—Robert A. Wax
*Assistant Examiner*—Tekchand Saidha
*Attorney, Agent, or Firm*—Adrian D. Battison; Murray E. Thrift

[57] ABSTRACT

A method of treating waste materials such as city or animal sewage which may contain toxic chemicals includes supplying the waste materials in slurry form using a dispensing machine in the field to a fibrous crop material so that the waste materials, water and toxic chemicals are taken up by the fibrous materials in the plant to avoid toxic materials collecting in the soil. The amount of nutrients in the waste material including phosphorous and nitrogen are measured. The volume of materials supplied to the plant is controlled upon the phosphorous level. The amount of nitrogen can be supplemented on the go from a separate tank on the dispensing machine.

20 Claims, 8 Drawing Sheets

METHOD FOR TREATMENT OF WASTE MATERIAL

BACKGROUND OF THE INVENTION

This invention relates method for treating waste material containing organic matter and potentially toxic levels of certain contaminants, such as heavy metals.

Waste material or effluent which contains organic materials, such as that from intensive animal farming operations, food processing plants and city sewage, constitutes a serious problem in that in large quantities the material is toxic and in that the material can give off noxious fumes. Disposal of such materials is therefore difficult and the development of such materials from the operation can inhibit the installation of new plants to carry out such processing.

Usually such waste material is stored in a lagoon which is simply a hollowed open area into which the material is pumped to allow settling of the solid matter to the bottom of the lagoon and dispersal of the liquid and gas content by evaporation. Periodically it is necessary to remove the settled solids and these are often simply dumped into an open field. The continuous evaporation of the liquid acts to discharge into the air noxious gases which leads to environmental pollution which is becoming politically unacceptable. The lagoon can also leak so as to cause contamination of the ground water.

A serious problem which arises with the discharge of materials of this type is that of the noxious or bad smelling fumes that are emitted by the anaerobic bacteria acting upon the nitrogen compounds of the waste materials. Such fumes arise wide public outcry in the event that such waste materials are dumped onto the ground in locations anywhere near any housing developments.

It is known to use an oxidizing agent, such as hydrogen peroxide, on liquid manure to destroy the anaerobic bacteria to reduce release of noxious gases.

However, simply treating the waste material so as to limit smell is insufficient to make dumping on an open field acceptable. This is because waste material often contains contaminants such as heavy metals in potentially toxic doses, a problem that is even more pronounced in city sewage. When this type of waste material is applied to an open field, the heavy metals will contaminate the soil and possibly the groundwater. This poses a significant health risk if the contaminated soil or groundwater is used for growing food crops as the heavy metals will be taken up by growing plants. As a consequence, there are restrictions on the per acre concentration of heavy metals permittable in disposed waste material. Obviously, there cannot be an infinite supply of land available for this purpose. Given the large amount of waste generated by a city of even medium size, disposal of civic sewage is clearly a growing and costly problem.

One machine for spreading waste material from hog barns and the like onto ground includes a frame with ground wheels for moving across the ground, the frame carrying a reel on which is wound a pipe for transporting the waste material from a supply. From the reel the waste material is communicated to a spray gun or spreader which discharges the material across the ground. This type of discharge of the material is unacceptable in that it generates smell, loses nitrogen which could otherwise be available for crop growth and also can release airborne bacteria which is dangerous to health.

An alternative type of machine for carrying out disposal of waste material includes a tank which transports the material to the required location and a spray boom for discharging the material onto the ground. Generally such processes are used simply for disposal of the waste material without any other advantages being considered or expected. The waste material is thus collected from a lagoon or storage container and is simply dumped into the field in a manner which is intended simply to dispose of the material. In many cases this is done in a relatively remote location with high quantities of the material being discharged into the field simply as a disposal process. The use of a tank to transport the material is basically unacceptable for larger quantities of the material in view of the very heavy weights of such a large tank which causes compaction of the ground over which the transport vehicle travels and the repeated trips which are necessary to dispose of all of the material. A machine of this type therefore is really only suitable for relatively small quantities of waste material to be discharged.

One example of a machine for dumping manure from hog barns is shown in article entitled "Fertilisation du lisier sur ble".

A brochure by Bauer entitled "Boom Cart AS45" shows a machine for irrigation which includes a reel cart and a boom assembly separate from the reel cart. The boom assembly is moved along a strip to be irrigated away from the reel cart and pulls a pipe from the reel. The boom assembly then moves along the strip of ground to be irrigated and water is pumped through the pipe to the boom. This arrangement is however not in any way proposed for discharging manure or other waste materials.

A further arrangement is known comprising a vehicle having a reel drum which is carried on the vehicle and supplies manure through a pipe line paid out from the reel to a jet nozzle carried on the vehicle for discharging waste materials onto the ground.

SUMMARY OF THE INVENTION

It is therefore an object of the present invention to provide a method of applying waste material to a field.

Method of applying waste material to a field comprising:
  collecting waste material containing organic matter, the material having a chemical composition and sufficient liquid content to allow pumping of the material through a pipe;
  providing a field arranged for planting and cultivating on the field of a crop to be harvested;
  transporting the waste material to the field;
  spreading the waste material over the ground so as to provide water and nutrients for promoting growth of the crop;
  monitoring the composition of the waste material during spreading to determine a measure indicative of the phosphate content thereof;
  and controlling the quantity of waste material of the waste material spread onto the ground in response to the monitored composition such that the amount of waste material applied to the field avoids applying to the field a quantity of phosphate which exceeds an allowable amount.

According to a second aspect of the invention there is provided a method of applying waste material to a field comprising:
  collecting waste material containing organic matter, the material having a chemical composition and sufficient liquid content to allow pumping of the material through a pipe;

providing a field arranged for planting and cultivating on the field of a crop to be harvested;

transporting the waste material to the field;

spreading the waste material over the ground so as to provide water and nutrients for promoting growth of the crop;

determining a maximum allowable quantity of the waste material to be applied to the field;

monitoring the composition of the waste material during spreading to determine the nitrogen content in the waste material;

and during spreading, when the nitrogen content falls below a predetermined amount such that with the maximum quantity being applied to the field the total nitrogen content in the waste material falls below a predetermined required level, adding a nitrogen containing nutrient to the waste material in an amount to supplement the nitrogen content in the waste material.

According to a third aspect of the invention there is provided a method of applying waste material to a field comprising:

collecting waste material containing organic matter, the material having a chemical composition and sufficient liquid content to allow pumping of the material through a pipe;

providing a field arranged for planting and cultivating on the field of a crop to be harvested;

transporting the waste material to the field;

spreading the waste material over the ground so as to provide water and nutrients for promoting growth of the crop;

wherein the waste material is spread by a machine having a central vehicle portion and a pair of boom elements each extending out to a respective side of the vehicle portion with a plurality of discharge nozzles at spaced positions along the length of each boom element;

wherein the nozzles are arranged in groups with the groups being at spaced positions along the length of the boom and the nozzles of each group being connected by a respective one of a plurality of pipes extending from the vehicle portion longitudinally of the boom element with each of the pipes being supplied with the waste material;

wherein there is provided in each of the pipes a flow meter for measuring the flow rate of the material therein;

wherein there is provided in each of the pipes a valve for controlling the rate of flow through the pipe;

and wherein the valves are controlled by a control unit responsive to the flow meters to maintain the flow rates in the pipes substantially equal.

In some cases the waste material is contaminated with heavy metals. Clearly, it is imperative that the exposure of food crops to potentially toxic contaminants such as heavy metals be limited. As noted above, simply storing or dumping the waste material does not end the risk of contamination. However, using the waste material as fertilizer for non-food crops provides a means for disposal of the waste material that is also commercially advantageous. During crop growth, heavy metals and other contaminants are taken up from the soil and incorporated into the plants. As the crop is not destined for consumption, the heavy metals do not pose a significant health threat. Additionally, the contaminants have been removed from the soil meaning that no risk is posed to other crops or groundwater.

Preferably, the non-food crop is a fibrous plant, specifically hemp. Hemp is an annual fiber with a long growing season, attaining a height of 6–8 feet, depending upon soil conditions. Additionally, the deep roots (40 cm) of hemp make it highly effective at leeching heavy metals out of the soil. Mature hemp produces strong, coarse fibers that are removed and processed by methods similar to those used in processing flax. Commercially, hemp fibers are used to provide firmness to recycled paper as well as for manufacturing newsprint. Historically, hemp fibers have also been used for a great variety of textiles, including coarse fabrics and rope.

The crop should be harvested prior to flowering. As stated above, the contaminants will be taken up by the growing plants and incorporated. Consequently, allowing the plants to go to seed risks recontamination of the soil since the plant after flowering and growth of the seeds tends to return water and nutrients to the roots.

Preferably the predetermined required level is determined based upon a mapped information concerning requirements at different locations in the field and wherein a position of the vehicle in the field is determined.

Preferably the nutrient is nitrogen and the amount of nitrogen is determined by measuring at the vehicle a content of $NH_4$ in the waste material.

Preferably the vehicle portion carries a storage tank containing a material for supplementing the level of the nutrient and wherein material is drawn from the tank and added to the waste material in response to the detected level.

Preferably the vehicle carries a reel for receiving a hose thereon through which the waste material is supplied to the vehicle wherein the reel is hollow and the storage tank is located inside the hollow reel such that the reel rotates around the outside of the storage tank.

Preferably the method includes providing a measured value indicative of a quantity of phosphorus in the waste material and controlling the waste material such that the amount of waste material applied to the field avoids applying to the field a quantity of phosphorus which exceeds an allowable amount.

Preferably the measured value is the density of the waste material.

The discharge openings are connected to the pump by pipes so that each boom segment is connected to one pipe. The pipes in turn are connected to the pump at spaced apertures such that flow through individual pipes can be regulated. As a consequence, any or all of the boom segments can be shut off at a given time without adversely effecting the pressure at the other discharge openings of the other boom segments.

Furthermore, a decrease in pressure is effected upon the discharge openings immediately prior to release of the waste material. This eliminates unwanted dribbling or spillage when the boom is shut off. As a consequence of this pressure drop, there is no need to wait for the boom to drain prior to moving and blockage at the discharge openings is virtually eliminated.

The chemical composition of the waste material is monitored during spreading. Due to the settling of solids, the composition of the waste material is not always uniform. This can be overcome by monitoring the content of the waste material and supplementing as needed during spreading, to ensure that uniform levels of nitrogen are applied. Alternatively, the content of the applied material could be varied based upon the location in the field. This information could be provided automatically by taking advantage of data provided by the Global Positioning Satellite system.

Preferably, the vehicle portion carries a reel having a hose wrapped thereon, the reel being rotatable to reel in and pay out the hose for communication of the waste material from a supply location through the hose to the vehicle portion. The reel is hollow, providing a location for the storage tank containing the supplemental material. Preferably, the position of the storage tank is fixed such that the storage tank does not rotate; rather, the reel rotates around the tank.

Preferably, the boom has a greater width than 100 feet and the hose has a length greater than 1320 feet. The boom height is adjustable for spraying crops as high as 8 feet. This is important because the nitrogen requirements of hemp are low for 2–4 weeks after planting but increase dramatically thereafter. Applying fertilizer or waste material immediately after planting provides hemp with nitrogen that the crop is unable to use immediately. Consequently, this nitrogen can be lost due to run-off, which, in turn, could contaminate the groundwater. However, the adjustable boom height allows for the application of fertilizer or waste material throughout the growing season without the risk of damage to the tops of the plants from the machine. Multiple applications of waste material to hemp throughout the growing season has several advantages: growth is promoted by providing nutrients throughout the growing season; multiple applications of waste material increases the amount of material that can be disposed of in a single growth season; and, the height of the crops will inhibit the spread of odor from the waste material. The concept of the adjustable height boom for application of fertilizer during the growth season could also be applied to other row crops, such as corn.

Preferably, the waste material is transported by a pump from the container through a temporarily installed piping to the supply location.

Preferably, the vehicle portion includes a supplementary pump thereon for the waste material. This will allow for uniform pressure to be maintained, allowing the waste material to be spread at a rate in the range of 1000 to 6000 gallons per acre.

BRIEF DESCRIPTION OF THE DRAWINGS

FIG. 1 is a schematic plan view of the farming system according to the present invention.

FIG. 2 is a side elevational view of the spreading vehicle with the boom elements extended.

FIG. 3 is a front elevational view of the spreading vehicle with the boom elements extended.

FIG. 4 is a cross sectional view of the boom element and discharge system.

FIG. 5 is a cross sectional view of an auxiliary pump on the spreading vehicle.

FIG. 6 is an exploded schematic isometric view of the closed container for receiving the waste material.

FIG. 7 is a schematic representation of fertilization of a hemp plant by treated waste material.

FIG. 8 is a schematic illustration of the spreading control system of the spreading vehicle.

In the drawings like characters of reference indicate corresponding parts in the different figures.

DETAILED DESCRIPTION

In FIG. 1 is shown an overview of the waste treatment method according to the present invention which comprises a processing system generally indicated at 10 which produces effluent or waste material on a discharge duct 11 for supplying to a storage container 12. The storage container can be of any suitable type including a metal container of the type formed from corrugated metal panels similar to a grain bin, a concrete pit or the like which is preferably covered by a closed roof 13 which contains the liquid and any gases escaping from the liquid surface. Within the container is provided a stirring system schematically indicated at 14 which maintains the waste material mixed to ensure that solids remain in suspension. An aerator is schematically indicated at 15 for injecting air into the stored liquid waste material for purposes of aeration. The details of the air injection system are not shown as these will be well known to one skilled in the art. In addition a solids injection system is indicated at 16 for injecting various solids including yeast, additive compound such as micro nutrients and phosphoric acid as discussed hereinafter.

The construction of the container is shown schematically in FIG. 6. This comprises an annular footing 60 which can be floating or (as shown) mounted on piles 61. On top of the footing is mounted a container wall 62 formed of corrugated panels 63 which are bolted together to form a cylindrical wall standing on the footing. The wall is of the type conventionally used for a grain bin and is manufactured of structural members and the corrugated panels with sufficient structural strength to accommodate the weight and forces from the liquid waste to be contained therein.

Within the wall 62 is provided a liner 64 of a suitable plastics material. This can be spray coated onto the interior of the wall or more preferably is formed as a skin which is laid across the open ground inside the annular footing 60 and extends up the wall 62 to a top edge. The liner is attached to the wall either mechanically or using an adhesive layer 94 which is applied onto the liner 94 on the outside surface thereof at the areas thereof engaging the wall 62 so as to affect a bonding between the liner and the wall. A roof structure comprises a central tubular post 68 sitting on a pad 69 mounted on the ground centrally of the annular footing. The post carries an inner end of a plurality of radially extending trusses 70, 71 which extend outwardly into engagement with a structural member at a top edge of the wall 62. Over the trusses is stretched a circular fabric cover 72 with a lower edge bead 73 which engages around the upper edge of the wall in a sealing action. Thus the container is effectively fully sealed by the liner 64 and the fabric cover 72 to prevent any escape of gases from the container. A vent opening 74 is provided to release some gases in the event of significant over pressure to prevent damage to the structure. A structure without the post can also be used using trusses extending across the container from the side wall taking the full load of the fabric cover.

A discharge pump is schematically indicated at 17 for discharging the liquid material from the container 12 along a temporary pipe line 18 which can be formed of a number of segments connected at junctions 20 or can be a continuous irrigation hose wound on a reel. Temporary piping of this nature can be installed relatively quickly over an extensive length to an outlet location 21 which constitutes a central supply point for discharging the material from the container 12 over a number of strips 22, 23 of a field 24 on which the material is to be sprayed.

The material is sprayed onto the ground between the rows of the planted crop by a spray vehicle shown schematically in FIG. 1 at 25 and shown in more detail in FIG. 2 and 3. The spray vehicle comprises a vehicle frame 26 mounted on ground wheels 27 for movement across the ground. The vehicle is relatively large having a width of the central vehicle portion of the order of 10 feet and a length of the order of 25 feet. The vehicle portion carries a large reel 28 on which is wound a pipe 29, a trailing portion 29A of which extends from the reel across the field to the discharge location 21. The pipe 29 is guided by a pulley system 31 to facilitate winding and unwinding. In one example the diameter of the reel is of the order of 13 feet and the length of the pipe is of the order of 1320 feet (500 meters) of a diameter of 3–4 inches (12 cm). The reel is hollow and within is a tank 32. The tank 32 does not rotate; rather, the pipe 29 is mounted on a reel drum rotatable around the outside of the tank 32. A cab 33 is mounted at the front of the frame for receiving the driver for controlling the direction and operation of the waste material discharge machine 25.

Figure 7:
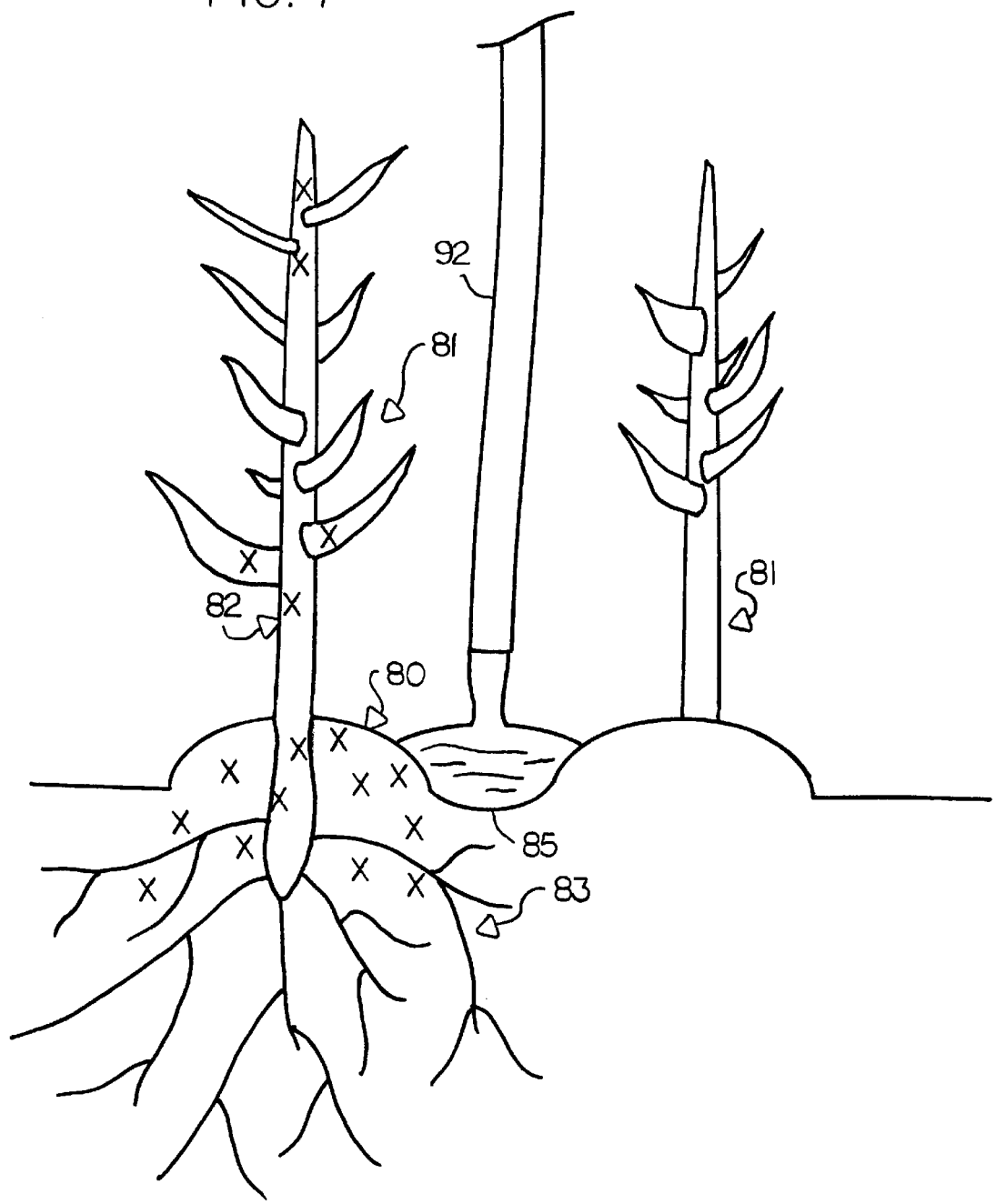

The boom elements are mounted on the frame for lifting and twisting movements by hydraulic cylinders which allow the boom elements to be folded along side the sides of the vehicle during transportation as shown in FIG. 7, and to effect raising and lowering of the boom elements as required.

Figure 3:
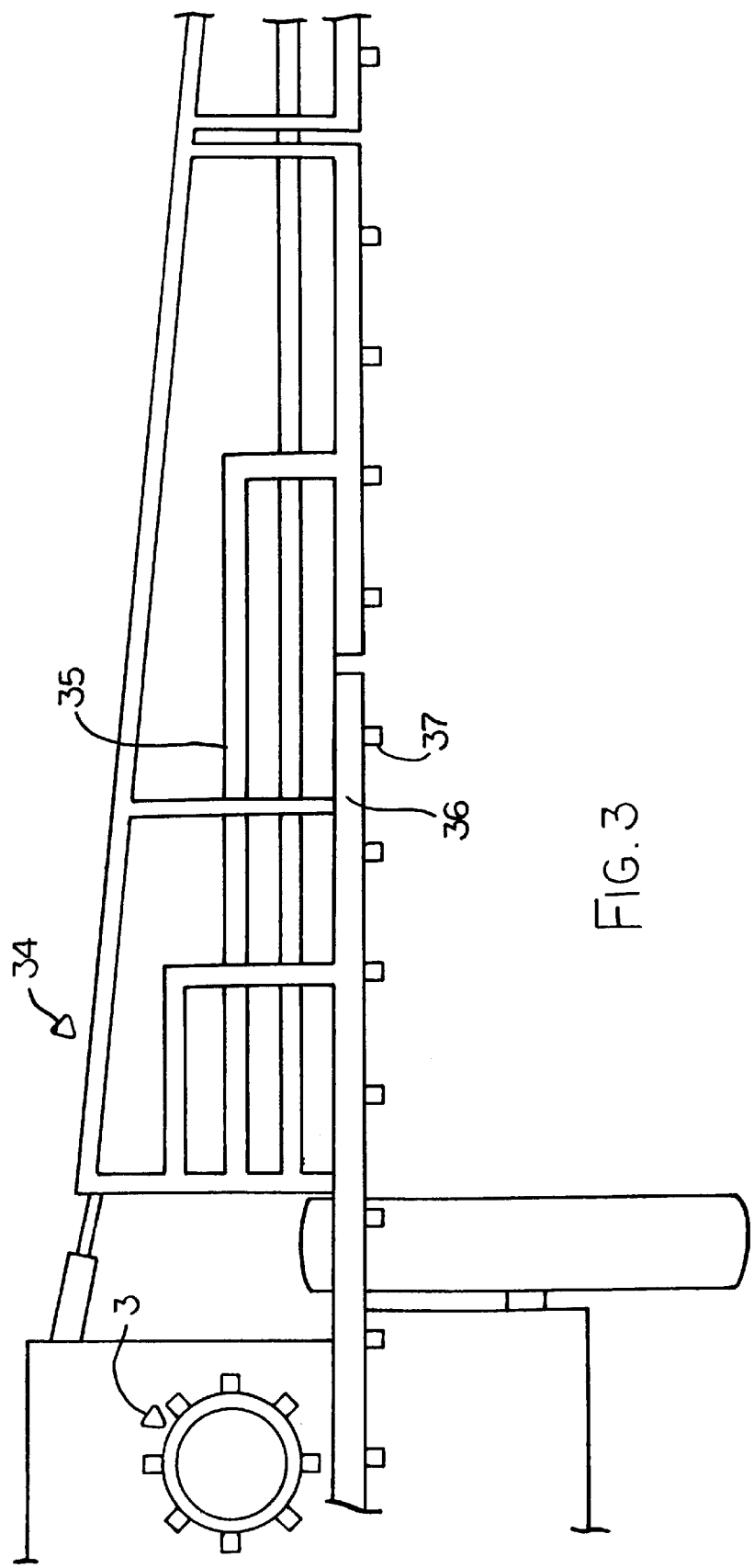
Figure 4:
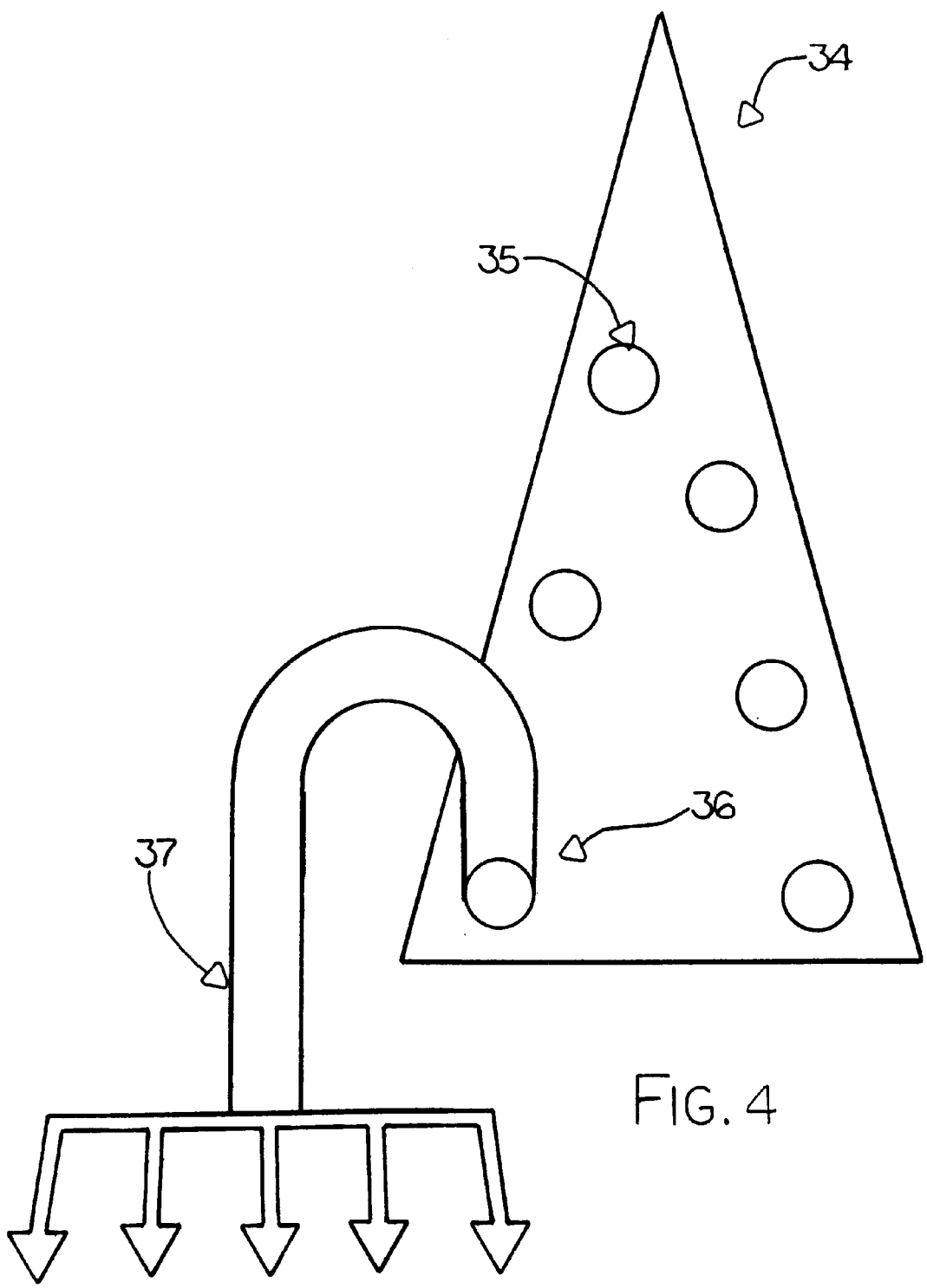
Figure 5:
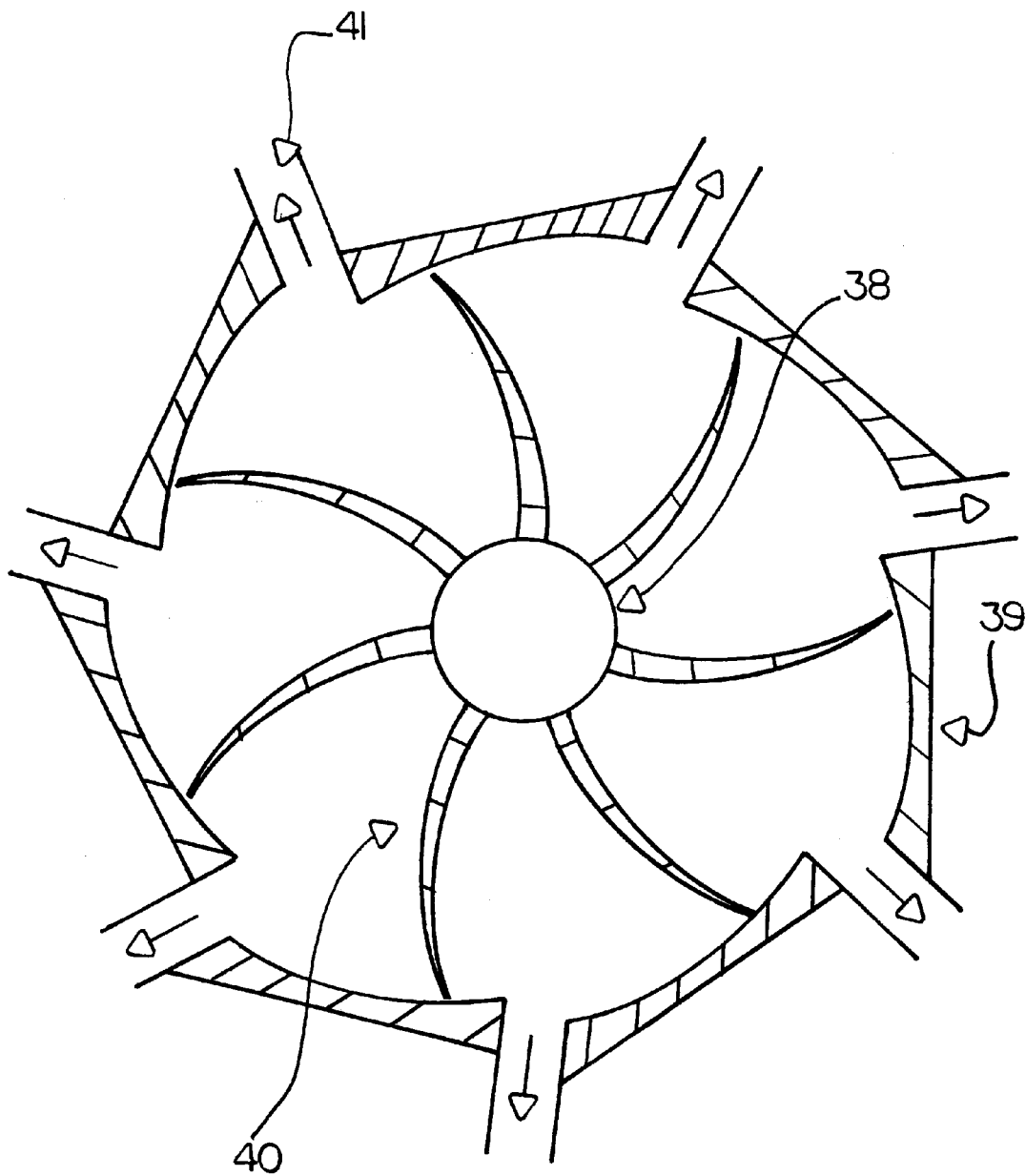
Figure 6:
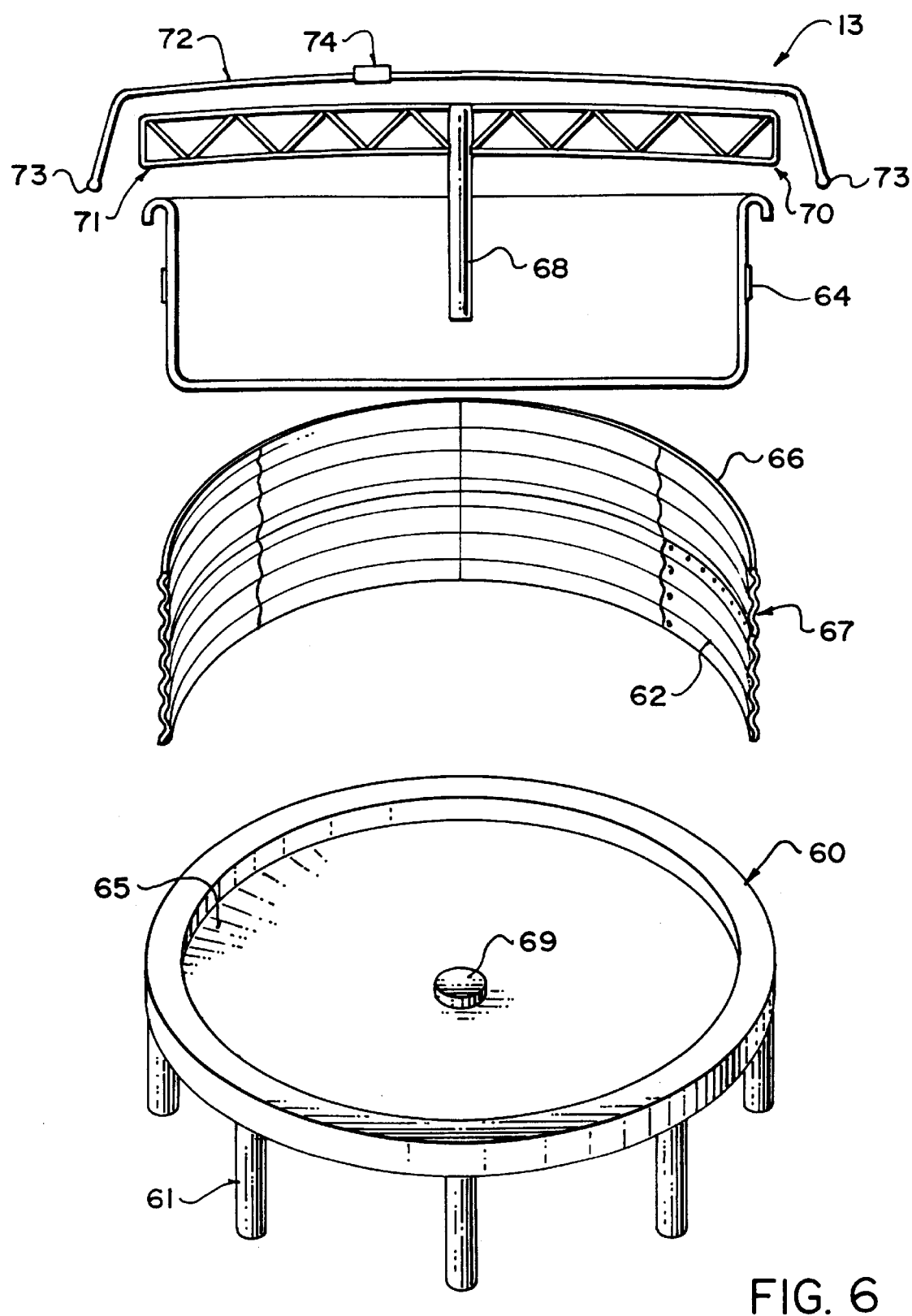

Preferably the boom elements 34 have a combined width of 100 to 150 feet. The boom elements 34 are comprised of segments, as shown in FIG. 3. Each boom segment is connect by a pipe 35 to the spray vehicle pump 30, described below. The pipe 35 consists of a horizontal component that extends from the vehicle portion along the length of the boom element 34 and a vertical portion that is connected to a multi-apertured pipe 36 at the base of the boom segment. Each aperture is connected to a spray nozzle system 37 shown in FIG. 4. The spray nozzle system consists of a vertical portion extending upward from the boom element continuing on as a curved portion and then as a second vertical section before terminating in a nozzle directed toward the ground. This design creates a pressure drop prior to the release point of the material. This eliminates unwanted dribbling or spillage when the boom is shut off. As a consequence of this pressure drop, there is no need to wait for the boom to drain prior to moving and blockage at the discharge openings is virtually eliminated.

The construction of the boom is shown only schematically as this can vary in accordance with design requirements.

The details of the waste material content monitoring system are not shown as these will be well known to one skilled in the art. Briefly, the waste material content monitoring system is connected to the hose 29 and supplies data to an instrument panel within the cab 33 of the spray vehicle 25.

The spray vehicle pump 30 is connected to the hose 29 and the waste material content monitoring system. The system comprises an aperture 38 in the middle of a circular chamber 39. A multiple appendage rotor 40 revolves around the circular chamber to ensure even distribution of the waste material to a series of evenly spaced apertures 41 that are connected to the pipes 35 that extend along the boom elements. Closing any of the evenly spaced apertures at this point will turn off the corresponding boom element segment, which, due to the rotor, will not effect the pressure at the other boom element segments.

Discharge of the liquid material onto the ground at a rate in the range 1000 to 6000 gallons per acre can thus be effected at a rate of 3 to 7 acres per hour. Such a discharge rate enables the discharge of a typical container having 300,000 gallons within a period of 10 to 20 hours.

Fertilization of a crop is shown in FIG. 7. Waste material 80 is applied to a crop 81, in this case, hemp, having a root system 83. Contaminants 82 present in the waste material 80 seep into the soil and are taken up by the root system 83 and incorporated into the stems and leaves of the growing hemp plant.

In the process, the waste material to be discharged can comprise manure from a hog plant, manure or effluent from a sewage plant or other mainly liquid material containing organic materials such as effluent from a vegetable or meat processing plant. The material is arranged by addition of liquid to be mostly liquid and of sufficiently liquid nature to be pumpable through the pipeline and through the pipe 20, 29A to the boom and the spray nozzles. For this purpose a solids content less than 8% is generally required.

The treatment of the liquid material in the container includes the following:

1) aeration by injection of aeration air from the injector 15 to promote aerobic bacterial action and to reduce anaerobic bacterial action. It is known that the anaerobic bacterial action generates production of noxious fumes which become unacceptable to surrounding persons not connected with the production site.

2) Addition of phosphorous compound or phosphoric acid. This addition acts to stabilize the nitrogen content within the liquid by locking in the ammonia. In particular, the addition of phosphoric acid to ammonia generates ammonium phosphate which is a stable compound widely used as a fertilizer.

3) The addition of a yeast which can preferably be a recycled beer yeast and this acts to break down the solids from the manure to increase the liquid content and render the liquid pumpable.

4) The stirring action by the stirrer 14 which maintains the materials mixed to effect the above action on the materials.

5) The addition of water if required to reduce the solids content to a level in the range 5 to 8% which provides the pumpable mixture. Generally the addition of yeast to break down the solids is preferred to avoid the addition of further water which may not be readily available.

6) The addition by the injector 16 of micro nutrients or other additives which are selected in accordance with requirements for the particular field 24 to be covered with the materials. Thus, as the present method is intended as a fertilization system, the required content of the fertilizer can be manipulated to match the requirements of the field as assessed by analysis of the soil in well known manner.

Waste material travels from the storage tank through pipe 20 to pump 21 and on to hose 29 of the spray vehicle 25. The hose 29 is connected to the waste material content monitoring system. This data is supplied to the operator in the cab 33 of the spray vehicle who then supplements the waste material with material from the tank 32 accordingly. The supplemented waste material enters the spray vehicle pump 38 and is distributed to the boom elements 34 by the pipes 35. Lastly, the supplemented waste material is discharged onto the ground through the discharge pipes 37. The waste material 80 engages the crop 81 and promotes growth. During this process, contaminants 82 in the waste material 80, such as heavy metals, are taken up by the root system 83 of the growing plants and incorporated into the stems and leaves.

Figure 2:
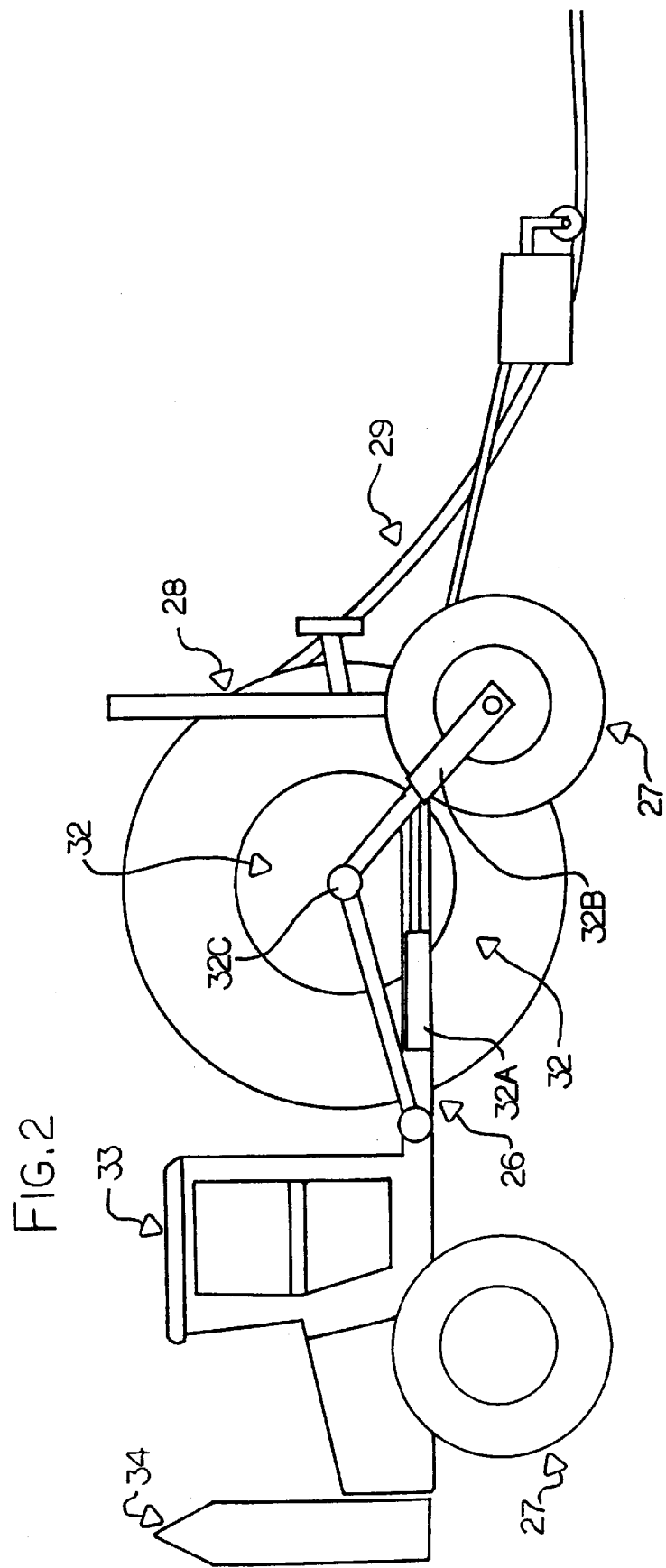
Figure 8:
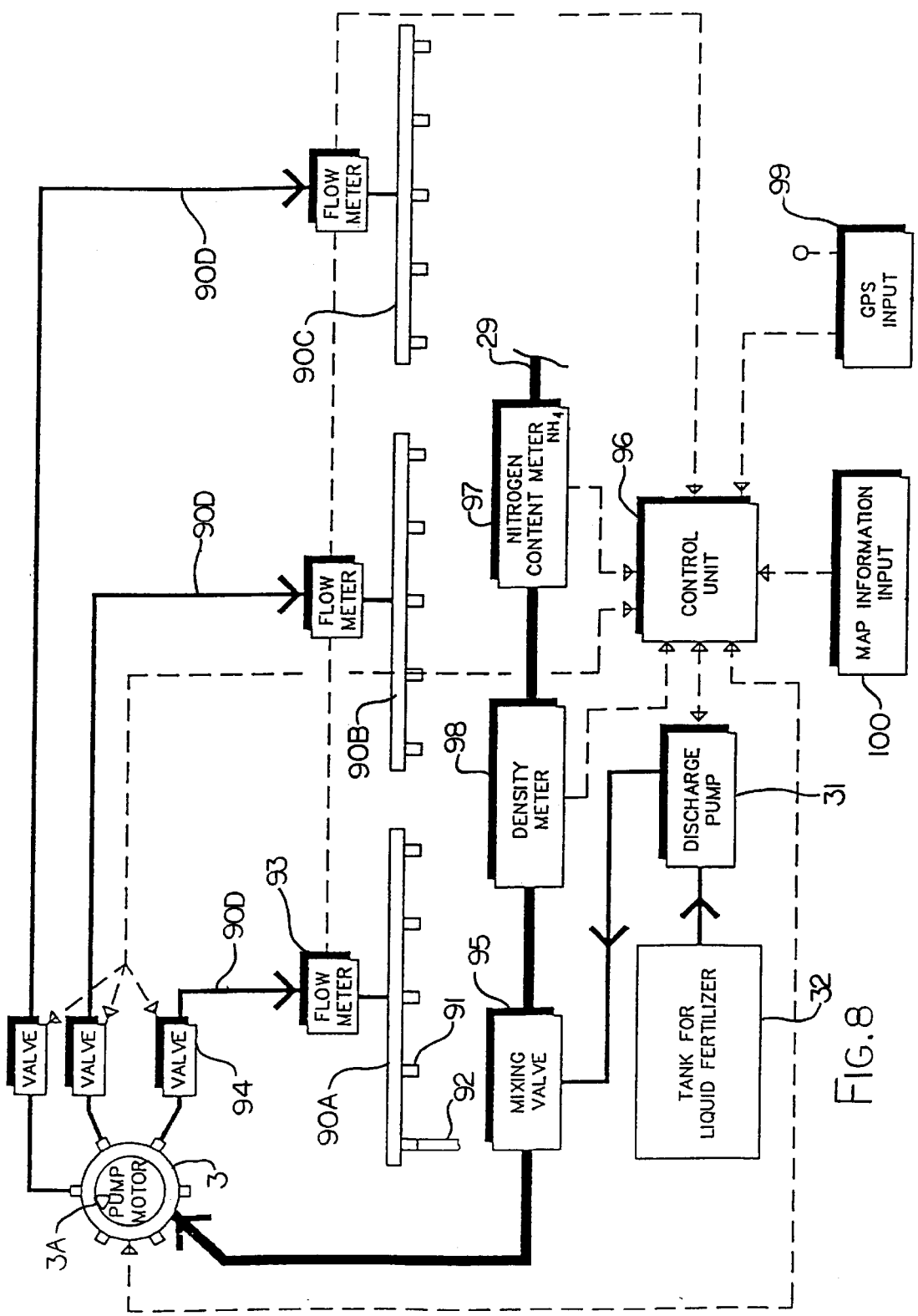

In FIG. 2, it will be noted that the height of the reel 28 and the tank 32 can be adjusted by actuation of a cylinder 32A which effects pivotal movement of a lever 32B carrying the rear ground wheels 27 about a pivot mounting axle 32C at the centre of the cylindrical tank 32. Thus the height of the reel can be raised and lowered to accommodate higher or lower crops. Turning now to FIG. 8, the system for controlling the discharge of the waste material is shown in more detail. The system comprises a plurality of pipe sections 90A, 90B, 90C arranged at spaced positions along the length of the boom (not shown). Each pipe section has a plurality of outlet nozzles 91 each of which carries a downwardly depending discharge pipe 92 having a length so that, as shown in FIG. 7, the pipe discharges the liquid at a position close to the ground so that the liquid enters an area 85 which is recessed relative to the areas on which the plants 81 are growing. The recess area 85 thus allows the liquid to accumulate between the rows of the crop so that liquid is prevented from engaging the crop material itself to prevent burning by the chemical action of the waste material in the crop.

Each pipe section 90A, 90B, 90C is connected to the pump 3 by a respective pipe 90D. Each of the pipes 90D includes a flow meter 93 and a gate valve 94. The flow meter is thus responsive to the actual flow of the waste material in the supply pipe and the gate valve is operable for controlling the flow rate through the pipe.

The pump 3 is of the centrifugal type which has a number of angularly spaced discharge openings so that the pressure at each of the openings remains equal thus supplying equal pressure to each of the pipes 90D. The gate valves 94 can be operated to close off one or more of the pipe sections. If the flow varies through the pipes due to the different lengths of the supply pipes in conjunction with the variations in flow rate and density of the material, the gate valves can be operated by an actuator system (not shown) and the control of a central control unit for maintaining the flow rates substantially equal to prevent variations in flow rate along the length of the boom.

The pipe 29 supplying the liquid to the vehicle is supplied to a mixing valve 95 which supplies the pump 3. The mixing valve 95 also receives liquid fertilizer from the tank 32 supplied by a discharge pump 31 controlled by the control unit 96. Thus the amount of liquid fertilizer added to the waste material from the pipe 29 can be varied by the control unit by actuating the discharge pump from zero addition up to a required addition to maintain the level of nutrients within the waste material at a required level.

The waste material from the pipe 29 passes firstly through a meter 97 of a type which is commercially available for measuring the nitrogen content particularly by measuring the NH4 content. A meter of this type is disclosed in French patent application 90 00194 filed by Etalissements Maugin S. A. and a product of the type as disclosed is available from that company. Secondly the waste material passes through a second meter 98 which measures the density of the waste material. The value detected by the meter 97 and 98 are communicated to the control unit 96. A density meter is available from Calibron Systems Inc of Scottsdale Ariz. which is designed for food products but is suitable for the present requirement.

The vehicle also includes a sensor 99 for the global positioning system so as to provide information to the vehicle concerning its location in the field. The vehicle further includes an input 100 by which information can be entered into the control unit relating to the particular requirements for specific areas of the field for nutrients and liquid. Such systems for pre-mapping the field and entering information concerning the detected conditions of the field are commercially available.

The amount of waste material to be applied to the field is controlled by operation of the pump 3 driven by a pump motor 3A controlled by the control unit 96.

In operation of the system, the vehicle detects the condition of the waste material through the sensors 97 and 98. The level of nitrogen in the waste material is detected by the sensor 97 and this is applied to the control unit together with information concerning the required amount of nitrogen for the area of the field on which the vehicle is located as generated by the inputs 99 and 100. The control unit thus calculates the required amount of liquid fertilizer to be added to the waste material so as to match the requirements of the location on the field and operates the discharge pump 32A to effect addition of the amount required of the liquid fertilizer at the mixing valve 95.

In this way the required level of nutrients in the waste material is maintained and is varied in dependence upon the field of position.

In addition the total volume of the waste material, and liquid fertilizer if any, is controlled by the pump 3 in dependence upon the density as measured by the density meter 98. It has been determined that the measure of density is proportion to the content of P2O5 that is the phosphate content. It has further been determined that the maximum amount of waste material which can be applied to the ground is in effect determined by the maximum phosphate content which can be applied to the ground at any location. The measure of density, therefore, provides a figure which can be used to determine the phosphate content of the waste material. The maximum amount of phosphate which can be applied to the ground can also be provided through the map information input 100 and these values can be collated in order to calculate a maximum quantity of the waste material which can be applied to the ground at any particular location. The density meter thus provides through a control unit a control of the pump 3 which effects discharge of the required volume of the waste material to the ground through the pipes 92. Having determined the maximum quantity of waste material which can be applied, the control unit also thus calculates the amount of supplement form the tank 32 which is required to be added to this maximum quantity to meet the requirement for nitrogen content in the waste material as required for the part of the field on to which it is applied.

The method according to the present invention, therefore, has a number of major advantages.

1) Waste material is treated without risk of soil or water contamination.

2) Waste material is used as fertilizer for a commercially viable crop, reducing the necessity for other types of fertilizer.

3) Fertilizer can be applied throughout the growing season, thereby improving crop yield while also limiting the risk of nitrogen run-off.

4) The process is effected using equipment specifically designed for the task which enables the uniform application of the waste material to be effected rapidly and economically.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of applying waste material to a field comprising:

collecting waste material containing organic matter, the material having a composition including a phosphate content and sufficient liquid content to allow pumping of the material through a pipe;

providing a field arranged for planting and cultivating in the soil on the field of a crop to be harvested;

transporting the waste material to the field;

applying the waste material to the soil in the field so as to provide water and nutrients for promoting growth of the crop in the soil;

monitoring the composition of the waste material during applying to determine a measure indicative of the phosphate content thereof;

measuring the phosphate content of the soil in the field;

determining a maximum quantity of the waste material which can be applied to the soil in the field by comparing the phosphate content of the waste material and the phosphate content of the soil in the field with a maximum allowable phosphate content of the soil;

and controlling the quantity of waste material applied to the ground in response to said determined maximum quantity such that the amount of waste material applied to the field avoids applying to the field a quantity of phosphate which causes the soil to have a phosphate content exceeding said maximum allowable content.

2. The method according to claim 1 wherein the phosphate content of the waste material is measured by measuring the density of the waste material.

3. The method according to claim 1 wherein the waste material is applied by a vehicle movable across the field and wherein the amount of waste material to be applied is determined based upon a mapped information concerning requirements at different locations in the field and wherein a position of the vehicle in the field is determined.

4. The method according to claim 1 wherein the waste material is monitored while applying to detect the nitrogen content in the waste material and wherein, when the nitrogen content falls below a predetermined required level, a nitrogen containing nutrient is added in an amount to supplement the nitrogen content in the waste material to the predetermined required level.

5. The method according to claim 4 wherein the nitrogen containing nutrient is added to the waste material prior to applying.

6. The method according to claim 4 wherein the waste material is applied by a vehicle movable across the field and wherein the predetermined required level is determined based upon a mapped information concerning requirements at different locations in the field and wherein a position of the vehicle in the field is determined.

7. The method according to claim 4 wherein the amount of nitrogen is determined by measuring the content of NH4 in the waste material.

8. The method according to claim 4 wherein the waste material is applied to the field by a vehicle and wherein the vehicle carries a storage tank containing the nitrogen containing nutrient for supplementing the nitrogen content of the waste material.

9. The method according to claim 8 wherein the vehicle carries a hollow reel for receiving a hose thereon through which the waste material is supplied to the vehicle and wherein the storage tank is located inside the hollow reel such that the reel rotates around the outside of the storage tank.

10. The method according to claim 1:

wherein the waste material is applied by a vehicle having a central vehicle portion and a pair of boom elements each extending out to a respective side of the vehicle portion with a plurality of discharge nozzles at spaced positions along the length of each boom element;

wherein the nozzles are arranged in groups with the groups being at spaced positions along the length of the boom and the nozzles of each group being connected by a respective one of a plurality of pipes extending from the vehicle portion longitudinally of the boom element with each of the pipes being supplied with the waste material;

wherein there is provided in each of the pipes a flow meter for measuring the flow rate of the material therein;

wherein there is provided in each of the pipes a valve for controlling the rate of flow through the pipe;

and wherein the valves are controlled by a control unit responsive to the flow meters to maintain the flow rates in the pipes substantially equal.

11. The method according to claim 10 wherein the material is pumped by a centrifugal pump and wherein the pump has angularly spaced apertures each connected to a respective one of the pipes such that pressure through individual pipes can be maintained substantially equal.

12. The method according to claim 10 wherein the valves are controlled by the control unit to halt flow to a selected one of the pipes while maintaining the same flow rates to the other pipes.

13. A method of applying waste material to a field comprising:

collecting waste material containing organic matter, the material having a composition including a nitrogen content and sufficient liquid content to allow pumping of the material through a pipe;

providing a field arranged for planting and cultivating in the soil an the field of a crop to be harvested;

transporting the waste material to the field;

applying the waste material to the soil in the field so as to provide water and nutrients for promoting growth of the crop in the soil;

determining a maximum allowable quantity of the waste material which can be applied to the soil in the field;

monitoring the composition of the waste material during applying to determine the nitrogen content in the waste material;

and during applying with the maximum allowable quantity of waste material being applied to the soil in the field, when the total nitrogen content in the waste material falls below a predetermined required amount, adding a nitrogen containing nutrient to the waste material in an amount to supplement the nitrogen content in the waste material to the predetermined amount.

14. The method according to claim 13 wherein the maximum allowable quantity is determined in response to a measure indicative of the phosphate content of the waste material.

15. The method according to claim 14 wherein the phosphate content is measured by measuring the density of the waste material.

16. The method according to claim 13 wherein the waste material is applied by a vehicle movable across the field and wherein the predetermined required amount of nitrogen content is determined based upon a mapped information concerning requirements of the soil for nitrogen at different locations in the field and wherein a position of the vehicle in the field is determined.

17. The method according to claim 13 wherein the amount of nitrogen is determined by measuring the content of NH4 in the waste material.

18. A method of applying waste material to a field comprising:

collecting waste material containing organic matter, the material having a composition and sufficient liquid content to allow pumping of the material through a pipe;

providing a field arranged for planting and cultivating in soil on the field of a crop to be harvested;

transporting the waste material to the field;

applying the waste material to the soil in the field so as to provide water and nutrients for promoting growth of the crop in the soil;

wherein the waste material is applied by a vehicle having a central vehicle portion and a pair of boom elements each extending out to a respective side of the vehicle portion with a plurality of discharge nozzles arranged at spaced positions along the length of each boom element;

wherein the nozzles are arranged in groups with each boom element having a plurality of the groups thereon arranged at spaced positions along the length of the respective boom element;

wherein the nozzles of each group are connected by a respective one of a plurality of pipes extending from the vehicle portion longitudinally of the boom element with each of the pipes being supplied with the waste material;

wherein there is provided in each of the pipes a flow meter for measuring the flow rate of the material therein;

wherein there is provided in each of the pipes a valve for controlling the rate of flow through the pipe;

and wherein the valves are controlled by a control unit responsive to the flow meters to maintain the flow rates in the pipes substantially equal.

19. The method according to claim 18 wherein the valves are controlled by the control unit to halt flow to a selected one of the pipes while maintaining the same flow rates to the other pipes.

20. The method according to claim 18 wherein the central vehicle portion carries a storage tank containing a supplement material for supplementing the waste material, wherein the central vehicle portion carries a hollow reel for receiving a hose thereon through which the waste material is supplied to the central vehicle portion and wherein the storage tank is located inside the hollow reel such that the reel rotates around the outside of the storage tank.

* * * * *